(12) United States Patent
Varjassy

(10) Patent No.: US 7,703,791 B2
(45) Date of Patent: Apr. 27, 2010

(54) FIFTH WHEEL COVER

(76) Inventor: Joseph A. Varjassy, Box 88, Riceton, SK (CA) S0G 4E0

( * ) Notice: Subject to any disclaimer, the term of this patent is extended or adjusted under 35 U.S.C. 154(b) by 139 days.

(21) Appl. No.: 11/924,218

(22) Filed: Oct. 25, 2007

(65) Prior Publication Data

US 2008/0106066 A1 May 8, 2008

Related U.S. Application Data

(60) Provisional application No. 60/857,316, filed on Nov. 3, 2006.

(51) Int. Cl.
*B62D 53/06* (2006.01)
(52) U.S. Cl. .............. 280/433; 280/507; 280/432; 224/527; 224/42.13; 224/42.12
(58) Field of Classification Search ............... 280/433, 280/507, 432; 224/527, 42.13, 42.12
See application file for complete search history.

(56) References Cited

U.S. PATENT DOCUMENTS

| 3,704,924 | A | * | 12/1972 | Lowry | 384/421 |
| 5,058,914 | A | * | 10/1991 | Murcheson | 280/433 |
| 5,165,713 | A | * | 11/1992 | Picard | 280/433 |
| D365,799 | S | * | 1/1996 | Murcheson | D12/161 |
| 5,536,031 | A | * | 7/1996 | Hurley | 280/507 |
| 5,720,492 | A | * | 2/1998 | Wanzenried | 280/433 |
| D450,276 | S | * | 11/2001 | Johnson | D12/161 |
| 6,857,652 | B2 | * | 2/2005 | Dougherty | 280/507 |

* cited by examiner

*Primary Examiner*—Lesley Morris
*Assistant Examiner*—Marlon A Arce
(74) *Attorney, Agent, or Firm*—Ryan W. Dupuis; Kyle R. Satterthwaite; Ade & Company Inc.

(57) ABSTRACT

A fifth wheel cover comprises a shell arranged to span over the fifth wheel plate of a tractor trailer chassis. The shell has a continuous, circular, peripheral edge to which a continuous band of elastomeric material is integrally joined about the full periphery for retaining the shell on the fifth wheel plate.

1 Claim, 2 Drawing Sheets

FIFTH WHEEL COVER

This application claims the benefit under 35 U.S.C. 119(e) of U.S. provisional application Ser. No. 60/857,316, filed Nov. 3, 2006.

FIELD OF THE INVENTION

The present invention relates to a protective cover for a fifth wheel plate on a heavy duty vehicle.

BACKGROUND

Heavy duty vehicles such as tractor trailers and large towing vehicles include a fifth wheel, which is a plate on the truck chassis to which a trailer kingpin is secured. When the trailer is detached from the chassis, the fifth wheel is exposed subjecting the lubricant thereon to contamination by road debris and thus potential damage. Accordingly, there is currently a need for a method of protecting an exposed fifth wheel plate.

U.S. Pat. No. 5,058,914 belonging to Murcheson discloses a fifth wheel slipcover for a bearing plate of a fifth wheel of a tractor. The cover includes a pair of formed sleeves at one end thereof for slidably receiving the spaced apart ramp portions of the bearing plate therein. A drawstring is provided at the opposing end of the cover for retaining the opposing end secured beneath the edge of the bearing plate. The structure of the sleeves requires awkward alignment of the cover with the ramp portions of the bearing plate which can interfere with proper fit of the cover on the bearing plate. The cover may also be poorly secured due to the draw cord which only extends partway about the periphery at the opposing end of the cover.

SUMMARY OF THE INVENTION

According to one aspect of the invention there is provided a fifth wheel cover for a fifth wheel plate of a towing vehicle, the cover comprising:

a shell arranged to span the fifth wheel plate;
the shell having a continuous peripheral edge;
elastomeric material secured along the peripheral edge;
the elastomeric material being arranged to retain the shell on the fifth wheel plate.

As described herein, the present invention relates to a cover for protecting a fifth wheel plate on a tractor trailer chassis including a moisture impermeable, resilient shell having a continuous peripheral edge. An elastomeric band is integral with the peripheral edge allowing it to tightly encompass and overlay a fifth wheel plate thereby protecting it from contamination and damage. The fifth wheel cover can thus prevent axle grease on the fifth wheel from being released into the environment.

By providing a continuous edge having a continuous elastomeric material band integrally formed thereon the cover can be readily installed onto the fifth wheel plate of a towing vehicle in any orientation while the elastomeric material firmly grips the plate from all directions. The cover according to the present invention is accordingly easier to install and more secure once installed as compared to prior art attempts to cover a fifth wheel plate.

According to a further aspect of the present invention there is provided a fifth wheel cover for a fifth wheel plate of a towing vehicle, the cover comprising:

a shell arranged to span the fifth wheel plate; and
elastomeric material secured along the peripheral edge;
the shell being formed of flexible and moisture-resistant material;
the shell having a continuous peripheral edge;
the peripheral edge of the shell being generally circular in shape;
the elastomeric material being continuous and integral along the continuous peripheral edge of the shell;
the elastomeric material being arranged to be snugly received beneath a peripheral edge of the fifth wheel plate to retain the shell on the fifth wheel plate; and
the shell being arranged to be wholly secured to the fifth wheel plate by the elastomeric material.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
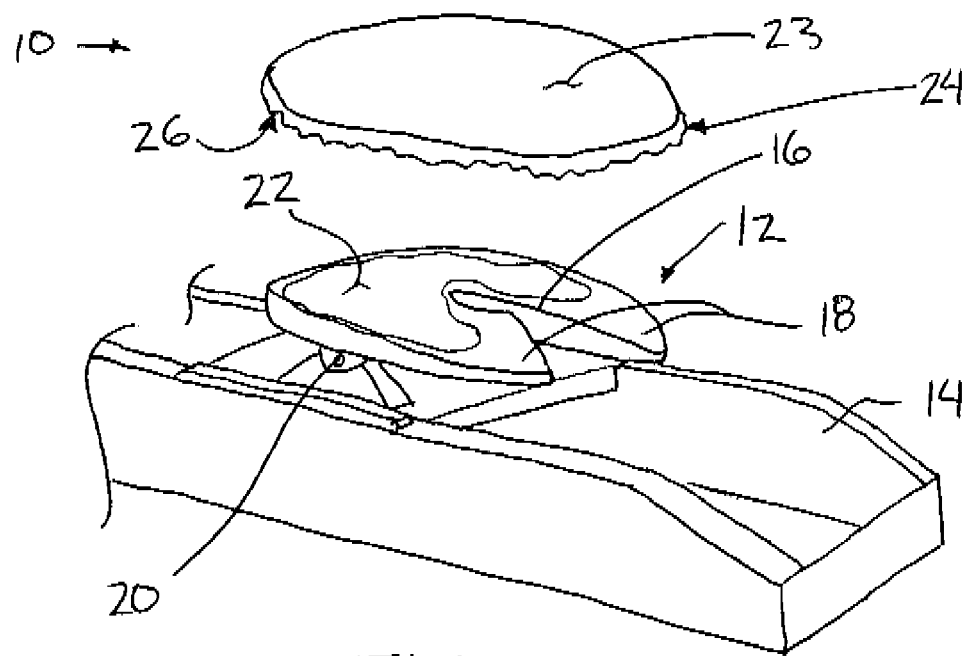
FIG. 1 is a perspective view of the cover shown separated from a fifth wheel plate upon which it is to be mounted.
Figure 2:
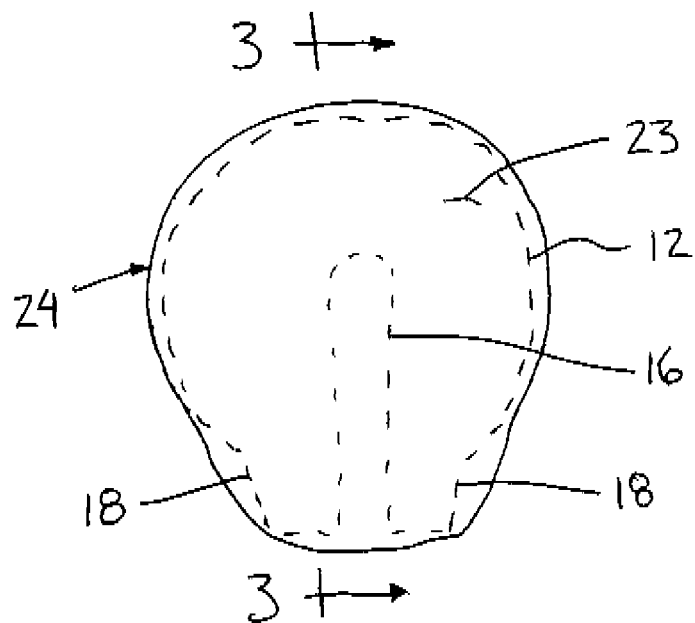
FIG. 2 is a top plan view of the cover shown mounted on the plate.
Figure 3:
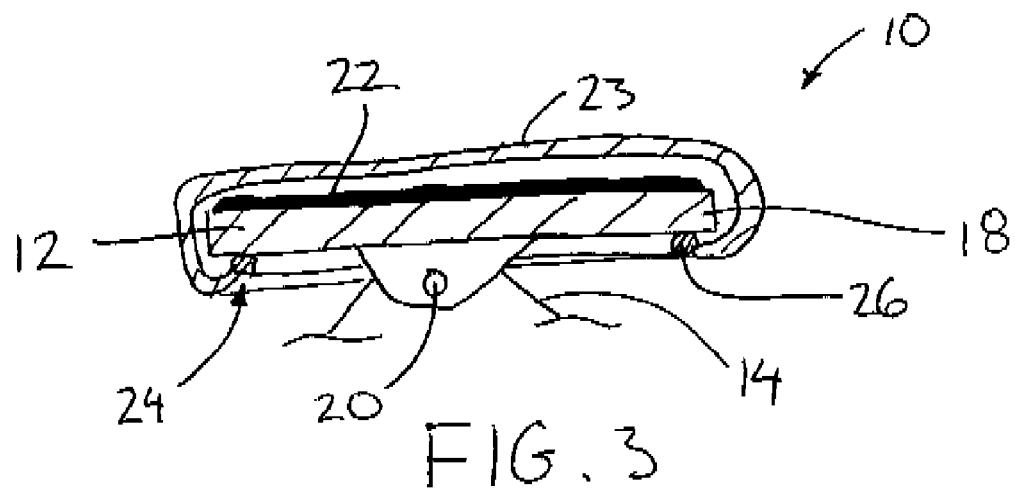
FIG. 3 is a sectional view along the line 3-3 of FIG. 2.
Figure 4:
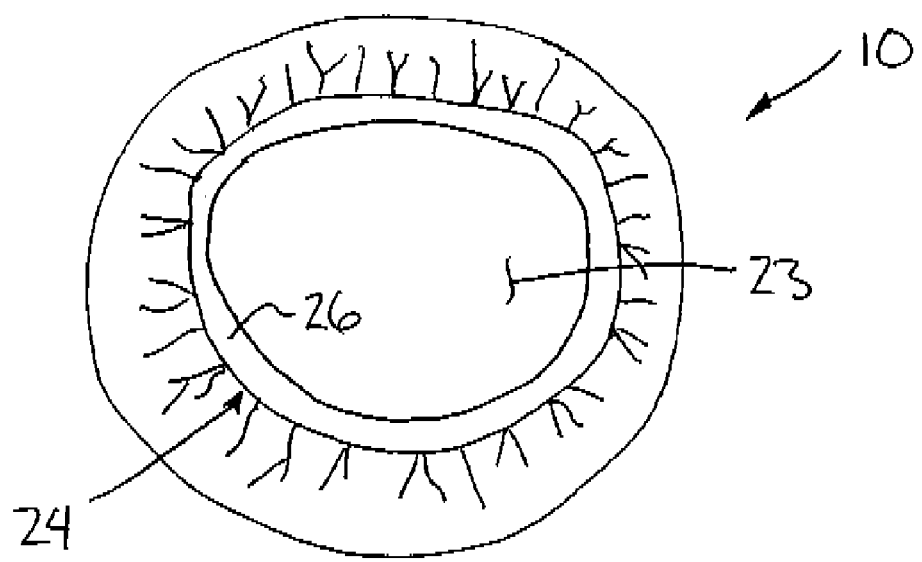
FIG. 4 is a bottom plan view of the cover shown separated from the fifth wheel plate.

Referring to the accompanying figures there is illustrated a fifth wheel cover generally indicated by reference numeral 10. The cover is particularly suited for covering the fifth wheel bearing plate 12 mounted on the chassis 14 of a truck tractor or other suitable towing vehicle.

The bearing plate 12 typically comprises a generally circular body having a flat upper surface. A guideway 16 in the form of a slot extends from a central location on the bearing plate rearward to an open rear end of the plate defined between a pair of ramp portions 18. The guideway 16 and the ramp portions 18 serve to guide a kingpin of a trailer to the center of the bearing plate for being locked in jaws typically provided beneath the bearing plate.

The plate is mounted on a suitable pivot 20 for pivotal movement generally forwardly and rearwardly in the direction of travel of the towing vehicle about a respective generally horizontal and laterally extending axis of the pivot. A layer of grease 22 is applied to the flat upper surface of the bearing plate to reduce friction between the trailer and the bearing plate as the trailer pivots relative to the tractor about an upright axis of the kingpin received in the guideway at the center of the fifth wheel.

The cover 10 generally comprises a shell 23 formed of a durable plastic material which is moisture resistant. The shell is generally formed of a flat flexible sheet having a circular peripheral edge 24. The sheet of material forming the shell 23 has dimensions which are greater than the lateral dimension of the plate 12 so that the cover is suitably arranged to fully span and cover the upper flat surface of the bearing plate and the outer peripheral edge of the bearing plate.

Elastomeric material is provided in a band 26 which extends about a full periphery of the shell 23 to be integrally secured along the peripheral edge 24 thereof continuously along the continuous circular peripheral edge 24 of the shell. The band 26 has a circumference in a relaxed state which is less than the peripheral circumference of the plate 12 so that the band 26 acts to pleat and gather the edge 24 of the shell beneath the plate 12 and thus acts to bias the edge of the shell into a retained position below the plate when a main portion of the shell spans across the upper surface of the plate.

In use, the upper surface of the plate is maintained with grease 22 to protect the plate and lubricate the plate relative to a trailer mounted thereon. When no trailer is mounted on the fifth wheel, the cover 10 is mounted onto the plate 12 by arranging the shell 23 to fully span the flat upper surface of the plate with the band 26 of elastomeric material being stretched over the peripheral edge of the bearing plate 12 to gather the peripheral edge 24 of the cover beneath the plate about the full periphery thereof.

The cover serves to prevent dirt and debris collecting in the grease on the bearing plate while also serving to prevent the grease from being washed off by rain and the like, thus preventing the grease from being dispersed into the environment. The cover can remain in place until the next use of the bearing plate 12 to support the trailer thereon. Forming the shell 23 of inexpensive durable plastic material permits the shell 23 to be readily disposable, however the durable nature of the plastic permits reuse if desired.

As described herein the fifth wheel comprises a plate that is typically mounted on the support frame of a truck chassis and which includes an elongated slot that receives a trailers hitch. The cover for the plate according to the present invention includes a flexible, moisture-resistant shell preferably constructed with durable plastic. The shell includes a continuous outer edge having an elastomeric band integral therewith. The shell is dimensioned and configured to tightly encompass the fifth wheel when placed thereover. Accordingly, when a trailer is detached from a truck chassis, the cover is placed over the fifth wheel thereby protecting it from debris and external damage. Furthermore, the axle grease contained on the fifth wheel is protected by the cover and will not be discharged into the environment when the truck is being cleaned.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A fifth wheel cover in combination with a fifth wheel plate of a towing vehicle, the cover comprising:
    a shell spanning the fifth wheel plate, the shell comprising a flat circular sheet of flexible and moisture-resistant material having a continuous peripheral edge which is circular in shape; and
    elastomeric material secured along the peripheral edge in which the elastomeric material is continuous and integral along the continuous peripheral edge of the shell about a full periphery of the shell;
    the elastomeric material comprising a continuous band which has a circumference in a relaxed state which is less than a circumference of a peripheral edge of the plate such that the peripheral edge of the shell is gathered by the band and the band is snugly received beneath the peripheral edge of the fifth wheel plate to retain the shell on the fifth wheel plate; and
    the shell being wholly secured to the fifth wheel plate by the elastomeric material such that only the elastomeric material secures the shell to the fifth wheel plate.

* * * * *